United States Patent [19]

Siemens, Jr. et al.

[11] 4,018,561
[45] Apr. 19, 1977

[54] APPARATUS FOR EXTRACTION OF POLONIUM - 210 FROM IRRADIATED BISMUTH USING MOLTEN CAUSTIC

[75] Inventors: Dan H. Siemens, Jr.; Earl J. Wheelwright, both of Richland, Wash.

[73] Assignee: Minnesota Mining and Manufacturing Company, Saint Paul, Minn.

[22] Filed: Feb. 26, 1975

[21] Appl. No.: 553,241

[52] U.S. Cl. .................... 23/267 R; 252/301.1 R; 423/2; 423/249; 23/272.6 R
[51] Int. Cl.² .................. B01D 11/04; C01G 57/00
[58] Field of Search .......... 23/271, 272.6 R, 308 S, 23/267 S, 267 R; 252/301.1 R; 423/2, 249

[56] References Cited
UNITED STATES PATENTS

| | | | |
|---|---|---|---|
| 31,951 | 4/1861 | Burlingame | 23/272.6 R |
| 737,625 | 9/1903 | Herreshoff | 23/272.6 R |
| 810,897 | 1/1906 | Acker | 23/272.6 A |
| 901,611 | 10/1908 | Greenawalt | 23/272.6 R |
| 1,378,084 | 5/1921 | Bacon | 23/267 S |
| 2,123,212 | 7/1938 | Scholler | 23/272 R |
| 2,619,413 | 11/1952 | Hill | 23/272.6 R |
| 3,042,503 | 7/1962 | Tuller | 23/308 S |
| 3,295,929 | 1/1967 | Allbright | 23/308 R |
| 3,774,036 | 11/1973 | Gerhart | 23/272.6 R |

FOREIGN PATENTS OR APPLICATIONS 15,558   1889   United Kingdom ............ 23/272.6

*Primary Examiner*—Stephen J. Emery
*Attorney, Agent, or Firm*—Cruzan Alexander; Donald M. Sell; Warren R. Bovee

[57] ABSTRACT

An extraction apparatus for removing polonium-210 from irradiated bismuth by a pyrochemical extraction process comprises a melting chamber suitable for melting irradiated bismuth, a reservoir for melted bismuth, an extraction chamber suitable for holding molten caustic and having means for circulating molten bismuth from the reservoir through the extraction chamber whereby said bismuth can be repeatedly cycled in counter flow through the molten caustic and the polonium-210 is removed from the irradiated bismuth.

3 Claims, 3 Drawing Figures

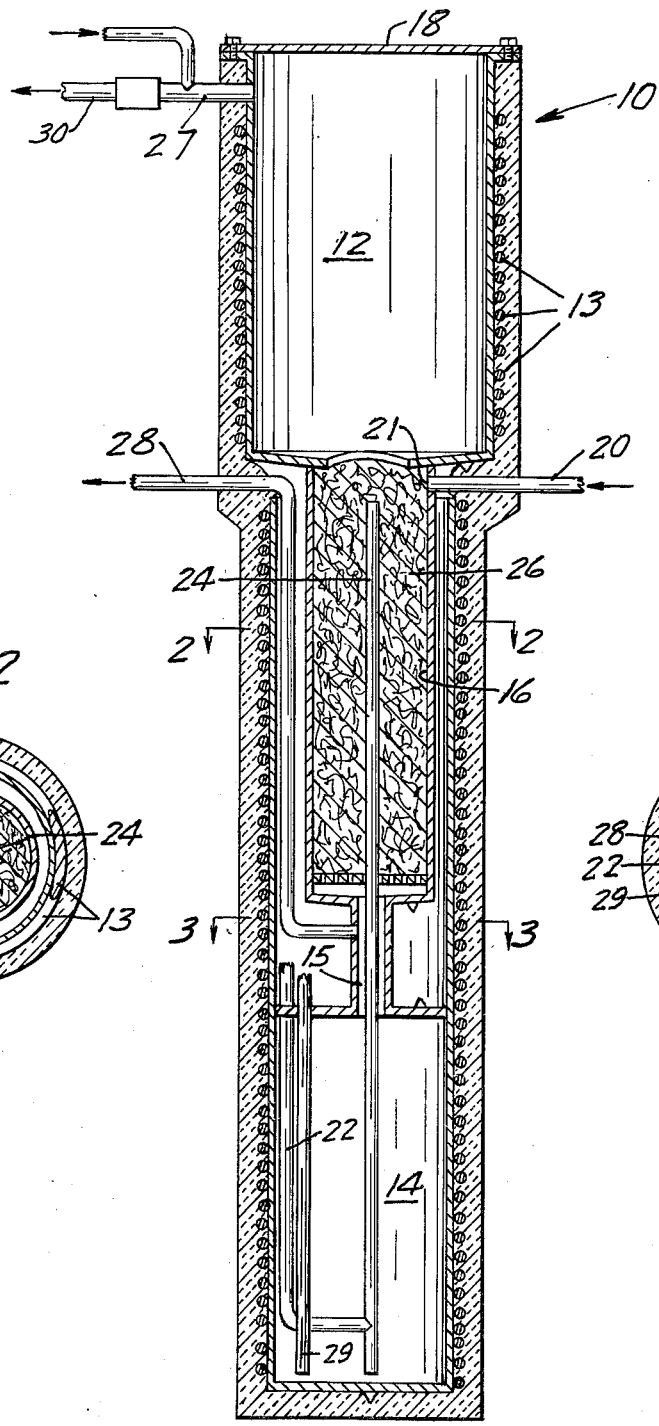
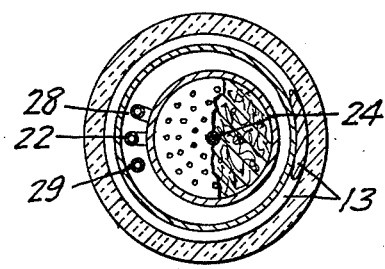
FIG. 1
FIG. 2
FIG. 3

4,018,561

APPARATUS FOR EXTRACTION OF POLONIUM - 210 FROM IRRADIATED BISMUTH USING MOLTEN CAUSTIC

BACKGROUND OF THE INVENTION

This invention relates to a method and an apparatus for recovering polonium-210 from irradiated bismuth using pyrochemical extraction techniques.

Neutron irradiation of bismuth produces polonium-210 according to the reaction $_{83}Bi^{209} + _{0}N^{1} \rightarrow {_{83}Bi^{210}} \xrightarrow{5.4 \text{ days}} {_{84}Po^{210}}$. Polonium-210 has a half life of about 138 days and decays by alpha emission to stable lead-206. Because of its short half life and high specific activity, polonium-210 is a valuable isotopic power source.

Various processes have been proposed and tested for the recovery and separation of polonium-210 from irradiated bismuth. In most processes the bismuth is dissolved in an acidic medium, such as acid chloride and the polonium-210 subsequently recovered and purified by precipitation, absorption, or liquid-liquid solvent extraction schemes. Also known is a method for recovering polonium-210 from bismuth by means of a combination of pyrochemical and liquid-liquid solvent extraction steps wherein molten bismuth containing polonium-210 is contacted at 400–500° C in an inert atmosphere with molten caustic material. The polonium is extracted from the molten metal phase to the molten caustic phase. After the phases are separated and the caustic phase dissolved in nitric acid, the polonium can be recovered by means of liquid-liquid solvent extraction such as treatment with dibutylbutylphosphonate. The prior art methods provide experimental processes for polonium separation but do not disclose an apparatus suitable for extracting large amounts of polonium-210 from kilogram quantities of irradiated bismuth.

The prior art procedures are reported in *I. and E.C. Process Design and Development*, Vol. 7, pp. 149–150, 1968 and Vol. 8, pp. 508–515, 1969; U.S. Pat. No. 3,463,739; U.S. AEC Report MLM 1661, Apr. 15, 1970; *Nuclear Sci. and Eng.*, Vol. 35, pp. 159–164, 1969 AEC Report D — 4146, MLM - 915, Aug. 1, 1953; and *J. Inorg. Nucl. Chem.* Vol. 29, pp. 848–853, 1967.

In order to successfully extract polonium-210 from irradiated bismuth metal, certain processing conditions must be satisfied:

1. oxygen must be excluded from the system to avoid oxidation of polonium-210 to the volatile oxide and to avoid the formation of bismuth oxide which will collect at the bismuth-caustic interface and interfere with polonium transfer from one phase to the other;
2. the bismuth-caustic phases must be intimately stirred or mixed to establish equilibrium conditions between the phases in a minimal amount of time; and
3. The molten bismuth must be contacted with sufficient molten caustic to bring about the transfer of essentially all the polonium from the bismuth to the caustic. The third condition can be accomplished by contacting one batch of bismuth with one large batch of caustic or by contacting both phases in a true counterflow arrangement or by contacting a batch of molten bismuth with several successive small batches of molten caustic material. The apparatus disclosed in this invention satisfies the conditions stipulated above, and in addition, requires fewer processing steps for use than currently used apparatus as well as avoiding the use of chlorides.

SUMMARY OF THE INVENTION

Briefly, the apparatus of this ivention comprises an extraction apparatus for removing polonium-210 from irradiated bismuth by an extraction process. A melting chamber suitable for melting solid irradiated bismuth is in fluid communication with a reservoir for melted bismuth. An extraction chamber suitable for holding a quantity of molten caustic is located above said reservoir, the lower end of the chamber being in fluid communication with the reservoir through a passage of restricted cross-sections. The extraction apparatus has means for pumping the molten bismuth from the reservoir to the upper portion of the extraction chamber where said bismuth is allowed to pass through said molten caustic and descend into the reservoir due to the action of gravity. The bismuth is in droplet form and the molten caustic extracts the polonium-210 from the bismuth. After the molten caustic has become saturated with polonium-210, the caustic is removed from the apparatus, fresh caustic can be added and the cycle repeated until all the polonium has been extracted.

BRIEF DESCRIPTION OF THE DRAWINGS

In the accompanying drawing:

FIG. 1 is a vertical cross-section of one embodiment of the apparatus of this invention;

FIG. 2 is a cross-section view of FIG. 1 taken along the line 2—2; and

FIG. 3 is a cross-section view of FIG. 1 taken along the line 3—3.

DETAILED DESCRIPTION OF THE PREFERRED EMBODIMENTS

Referring to the accompanying drawing FIGS. 1, 2 and 3, in which like reference numerals refer to like parts, generally the bismuth is placed in a melting chamber 12 and heated to a temperature of at least 450° C by heating elements 13 connected to an external power source which will maintain the bismuth in a molten state. When the melting point of the bismuth (slightly over 270° C) is exceeded, the molten bismuth will drain downward due to gravity and collect in a reservoir 14 at the bottom of apparatus 10. After collecting in the reservoir 14, the molten bismuth is pumped to the top of an extraction chamber 16 and allowed to fall in dropwise form through molten caustic (e.g. anhydrous sodium hydroxide) which has been introduced into the extraction chamber.

In greater detail, as a precautionary measure, prior to using the apparatus of this invention, the empty apparatus 10 is sealed, connected to a vacuum pump and heated to an operating temperature of about 450° C. for several hours under vacuum conditions to reduce the amount of oxygen absorbed on the internal surfaces of the apparatus. A dry inert gas is then introduced through inlet 27 filling the apparatus which is cooled to ambient temperature. While flushing from the bottom with inert gas, the lid 18 of apparatus 10 is opened and irradiated bismuth rods are placed in the melting chamber 12 and the lid resealed. The apparatus 10 is repeatedly evacuated and back-flushed with an inert gas such as argon, at ambient temperature, to minimize the amount of oxygen contained in the system.

Positive gas pressure is maintained during the entire processing cycle to prevent leakage of air into or through a gasket or valve seal. The temperature of the equipment, after the melting chamber 12 is filled with the irradiated bismuth rods, is increased to 450° C. and the bismuth melts, the molten material draining through the extraction chamber 16 and collecting in the reservoir 14 at the bottom of the apparatus 10. Sufficient bismuth is used in each processing run to just fill the reservoir 14 at the operating temperature. A narrow passage 15 between the reservoir 14 and the extraction chamber 16 serves to facilitate separation between molten bismuth and molten caustic. Enough caustic to fill the extraction chamber 16 is melted in an auxiliary vessel, outgassed by evacuation of the vessel and placed in the apparatus. Molten caustic enters the reaction apparatus via the heated pipe 20 and inlet 21 until the extraction chamber 16 is filled with molten caustic. When the extraction chamber is filled with the molten caustic, an inert gas is introduced to the gas-lift pipe 22 under sufficient pressure to drive a mixture of gas and bismuth out the top of the vertical pipe 24. A counterflow of molten bismuth and caustic is thus produced and essentially all of the bismuth contacts the caustic. The molten bismuth intimately contacts molten caustic material in the extraction chamber 16 as the bismuth droplets trickle down through the packing 26 in the extraction chamber. Under normal operating conditions using this apparatus the total volume of bismuth is cycled through the extraction chamber 16 in about 10-20 minutes. Because it is extremely difficult to sample the amount of polonium in the two phases while they are in the reaction vessel, the approach to equilibrium as a function of time is not certain.

However, an arbitrary two-hour extraction period has been found suitable for allowing each batch of caustic to extract the maximum amount of polonium-210 from the molten bismuth. After the processing period, the gas lift is turned off, the system pressurized via line 27 and the caustic material transferred out of the extraction chamber via line 28. The caustic is vacuum transferred through a heated valve and pipes to a separate vessel where it is cooled and then dissolved in nitric acid. A constant flow of inert gas into the apparatus is employed to maintain a 1-2 pound per square inch positive gage pressure during the transfer of the caustic to and from the contactor. A pressure relief valve 30 is usefully provided. A second batch of molten caustic can then be transferred into the apparatus via line 20 and the extraction cycle repeated. The amount of polonium extracted during each cycle and the number of cycles required to completely recover the polonium-210 present is determined emperically from polonium-210 assay of each batch of caustic "dissolver solution." (cf. Table I)

At the conclusion of the final extraction cycle, the spent bismuth is removed from the reservoir in molten condition through dip tube 29 by closing the outer outlet pipes and pressurizing the apparatus. Tube 29 leaves the apparatus at the same level as pipe 28.

Helium, argon, nitrogen or mixtures thereof can be used as the inert gas in this process. It is also possible to use mixtures of the inert gas with hydrogen, e.g., a 96 percent argon 4 percent hydrogen having been used as the lift gas. A small amount of hydrogen serves the useful purpose of providing a slightly reducing atmosphere to avoid any formation of bismuth oxides should some residual oxygen remain after flushing the system although this is generally not necessary.

Molten caustic and molten bismuth are known to have highly corrosive effects; consequently, corrosion resistant materials are used throughout the apparatus. Among the suitable alloys useful in the practice of this invention are the nickel based alloys with and without alloying agents, one example being "Inconel" 600, a nickel based alloy with an addition of chrome and iron as well as stainles steels such as the 300 type stainless steels. Similar materials can be used for the packing, one suitable packing being ¼ inch long pieces of ¼ inch diameter "Inconel" 600 rod.

EXAMPLE

To demonstrate the operation of the apparatus, an extraction device similar to FIG. 1 was constructed. The device was flushed with a 96 percent argon, 4 percent hydrogen mixture.

After flushing, 20.45 kilograms of irradiated bismuth containing 1194 curies of polonium was placed in the melting chamber and the temperature raised to about 450° C. The bismuth melted and flowed through the extraction chamber into the storage reservoir.

Nine-hundred gram batches of sodium hydroxide were melted, degassed, and added to fill the contacting chamber which was maintained at a temperature of about 450-500° C. The gas lift was operated at a steady state using the argon-hydrogen mixture noted above, the bismuth being cycled through the extraction chamber about every 20 minutes.

The spent bismuth was removed from the reactor and the reactor flushed with nitric acid. The processing runs and extraction data are summarized in Table I.

Table I

| Run No. | Dissolver Sol. ml. | Accumulated Curies Extracted |
| --- | --- | --- |
| 1 | 5400 | 741 |
| 2 | 5400 | 1011 |
| 3 | 5400 | 1104 |
| 4 | 5400 | 1154 |
| 5 | 5400 | 1162 |
| clean out | 3000 | 1190 |

As shown by the Table, the apparatus provides a useful device for extracting polonium-210.

What is claimed is:

1. An extraction apparatus for removing polonium-210 from irradiated bismuth by extraction into molten caustic consisting of a self-supporting unitary hollow body containing vertically superimposed compartments comprising:
    an upper melting chamber suitable for melting solid irradiated bismuth;
    an intermediate extraction chamber suitable for containing molten caustic communicating with said melting chamber at its upper end, the lower end of said extraction chamber having an outlet of restricted cross-section facilitate separation of molten bismuth from molten caustic;
    a lower reservoir chamber connected at its upper end to the outlet of said intermediate extraction chamber for containing molten bismuth;
    heating elements surrounding said body to heat said compartments to temperatures sufficient to maintain said caustic and bismuth in molten condition;

pump means and associated distribution means contained within said hollow body for moving said molten bismuth from said reservoir chamber to a discharge point at the upper end of said extraction chamber and to permit molten bismuth to pass downwardly through molten caustic in said extraction chamber in drop-wise form;

means for excluding oxygen from and producing an inert atmosphere within said apparatus; and means for removing the polonium-carrying molten caustic from said extraction chamber.

2. The extraction apparatus of claim 1 where said means for moving the molten bismuth from said reservoir is a gas-lift pump.

3. The apparatus of claim 1 where said extraction chamber contains a packing to facilitate good contact between the molten caustic and the molten bismuth.

* * * * *